No. 896,157. PATENTED AUG. 18, 1908.
G. ROBERTS.
ADJUSTABLE SPANNER.
APPLICATION FILED AUG. 19, 1907.
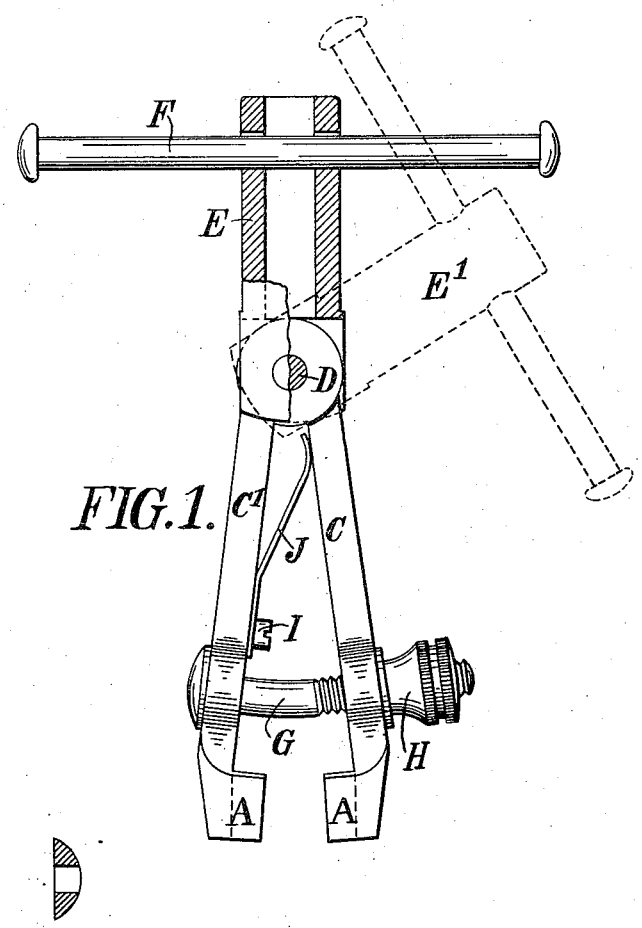
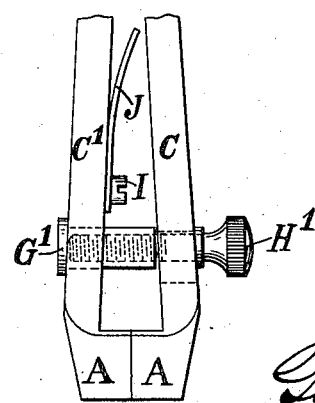

UNITED STATES PATENT OFFICE.

GUSTAV ROBERTS, OF LIVERPOOL, ENGLAND.

ADJUSTABLE SPANNER.

No. 896,157.        Specification of Letters Patent.        Patented Aug. 18, 1908.

Application filed August 19, 1907. Serial No. 389,224.

*To all whom it may concern:*

Be it known that I, GUSTAV ROBERTS, a subject of the King of Great Britain, residing at Liverpool, in the county of Lancaster, in the Kingdom of England, have invented certain new and useful Improvements in Adjustable Spanners, for which application has been made in Great Britain, No. 20,850, dated September 20, 1906.

This invention has for its object the application of the principle of the vise to a box spanner.

In the drawings, Figure 1 is an elevation, partly in section, Fig. 2 the lower part only showing a slight variation. Fig. 3 a section of washer.

In these A A are two jaws having an angle cut out of them at an angle of 90 or 120 degrees as the case may be, so as to grasp two sides of an angle of the nut or supposing the nuts be formed of any special contour, the jaws are shaped to that contour. C C are two legs carrying these jaws, joined with a hinge at D in the manner of a vise. One of these legs can be continued on as at E so as to form a handle, or it can be terminated at the hinge D, and a handle E′ having jaws grasping the hinge D can be pivoted on the central pivot of the hinge D so that it can stand at any desired angle such as shown at E′.

F is the tommy-bar for turning the vise, which can be made to slide in its bearings as with an ordinary vise and is shown in full lines, or be fixed in place as shown in dotted lines.

G is the screw as in an ordinary vise, and H the nut. In Fig. 1 this screw is shown for a considerable portion of its length curved to an arc of a circle, having D G for its radius. By this means the nut H always lies true on the surface of the leg C. In Fig. 2, a different arrangement is shown. The screw is straight, and is screwed into a hollow internal screw G′ having a head. In this instance the hole through which the screw passes is made with plenty of play, so that the screw can take any angle. In some instances I put a rounded washer between the head of the screw G′ and leg C′ and between the nut H′ and the leg C so that there may be no strain on the screw. A rounded washer of this description is shown at Fig. 3. The nut H or the screw H′ is milled in order to enable it to be more easily handled and the screw G or the hollow screw G′ is preferably made to fit tight in the leg C′ in any wellknown manner. For instance it could be slightly square, be angular or keyed and fit a corresponding hole. It therefore will not run round in the leg C′ when H or H′ is turned.

J is the ordinary vise spring keeping the two legs distended apart from each other. It is fixed by a set screw I to one of the legs.

The mode of action is as follows;—The jaws A A sufficiently opened are placed over the nut, and the nut or screw head H or H′ is turned until the jaws are sufficiently tight on the nut. The box spanner is now turned round by the tommy-bar until the nut is screwed up or unscrewed, when it is loosened and withdrawn from the nut. It is also obvious that although a tommy-bar is shown here fixed or sliding in the continuation E so that it is immovable, any ordinary handle for turning round a box spanner can be used; also that if the legs C′ and C be long enough, the part E of the tommy-bar can be dispensed with, the handle fitting the hinge or the pivot of the hinge being sufficiently long to act as a cross handle.

I claim as my invention.—

1. A box spanner comprising in combination a pair of jaws formed to fit a nut; an adjusting screw passing through both of said jaws, said screw being provided with a head; a washer interposed between said head and the adjacent face of the jaw; a spring serving normally to hold the jaws apart; a handle; a pivot pin passing through said handle and the jaws and forming the pivot for the jaws; and a tommy-bar passing through the handle.

2. A box spanner comprising in combination, two jaws provided to fit inwardly projecting portions formed to fit a nut; a screw passing through such jaws, said screw being so arranged that the jaws may be opened wide or drawn close together without cramping the screw; a pivot pin for the jaws; and a handle mounted upon the pivot pin and extending outwardly from the jaws.

In witness whereof, I have hereunto signed my name this 8th day of August 1907, in the presence of two subscribing witnesses.

GUSTAV ROBERTS.

Witnesses:
    WM. P. THOMPSON,
    MYLES HAILES.